Jan. 22, 1963 D. C. ROCKOLA 3,074,725
AUTOMATIC PHONOGRAPH
Filed July 13, 1959 6 Sheets-Sheet 1

INVENTOR.
David C. Rockola
BY
Horton, Davis, Brewer & Brugman
Attys.

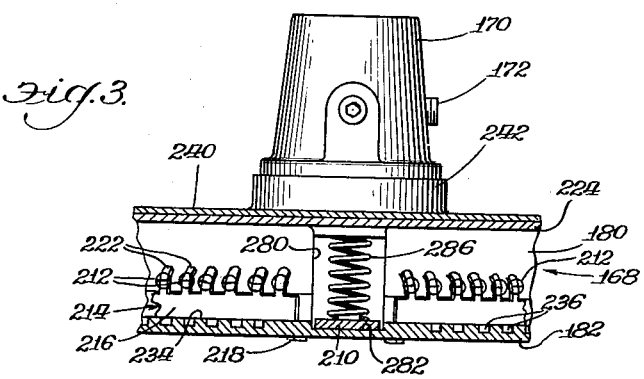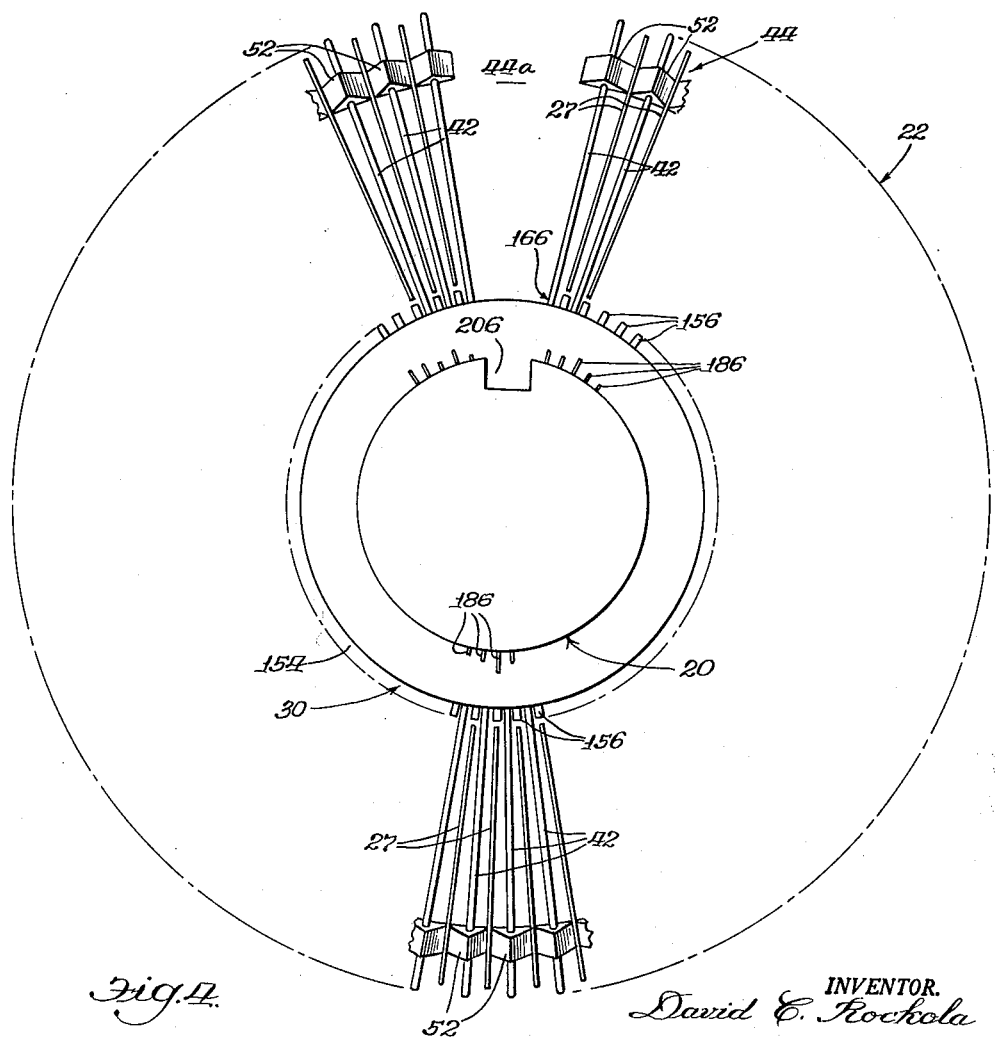

Jan. 22, 1963  D. C. ROCKOLA  3,074,725
AUTOMATIC PHONOGRAPH
Filed July 13, 1959  6 Sheets-Sheet 3
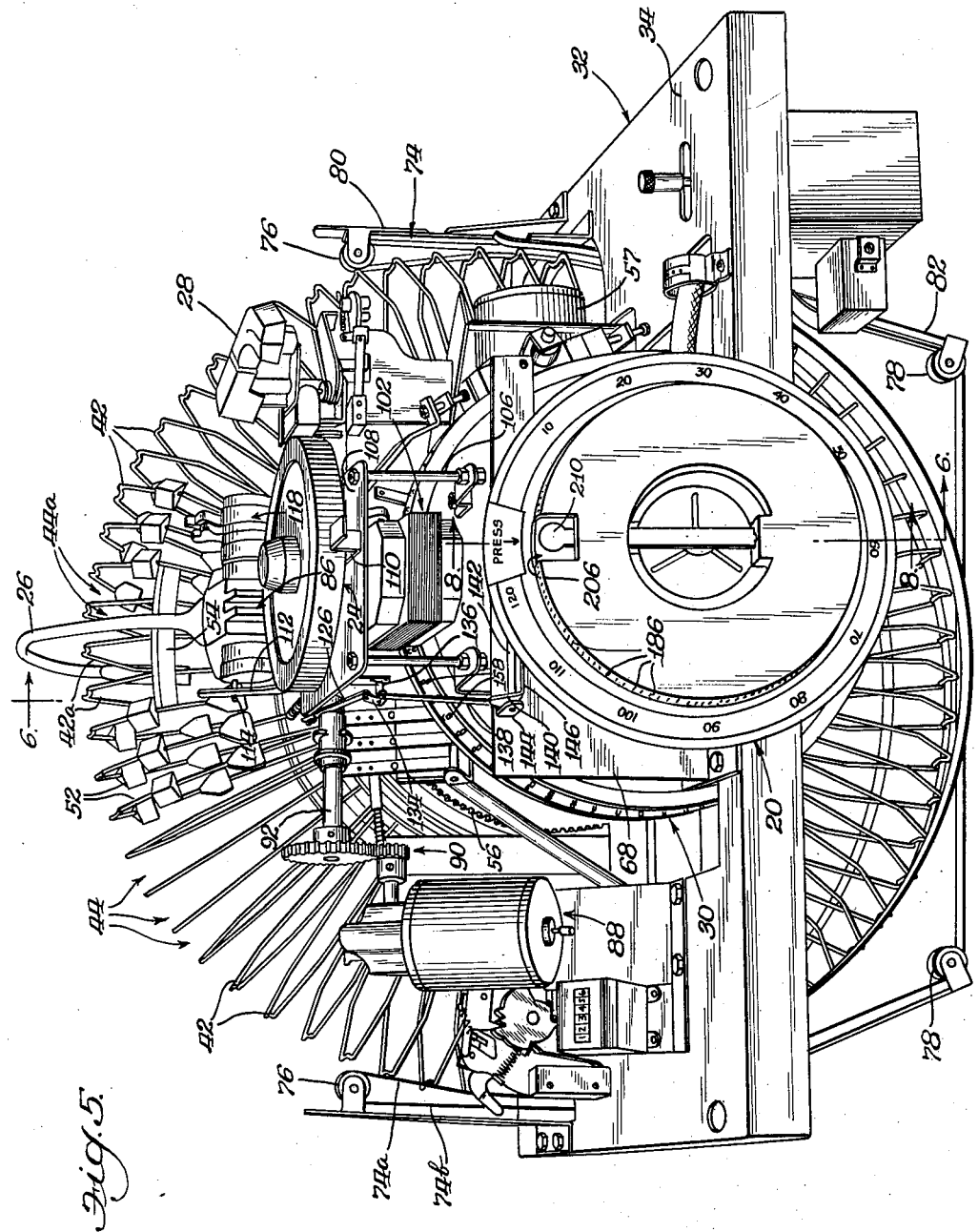
INVENTOR.
David C. Rockola
BY
Horton, Davis, Brewer & Brugman
Attys.

Jan. 22, 1963 D. C. ROCKOLA 3,074,725
AUTOMATIC PHONOGRAPH
Filed July 13, 1959 6 Sheets-Sheet 4
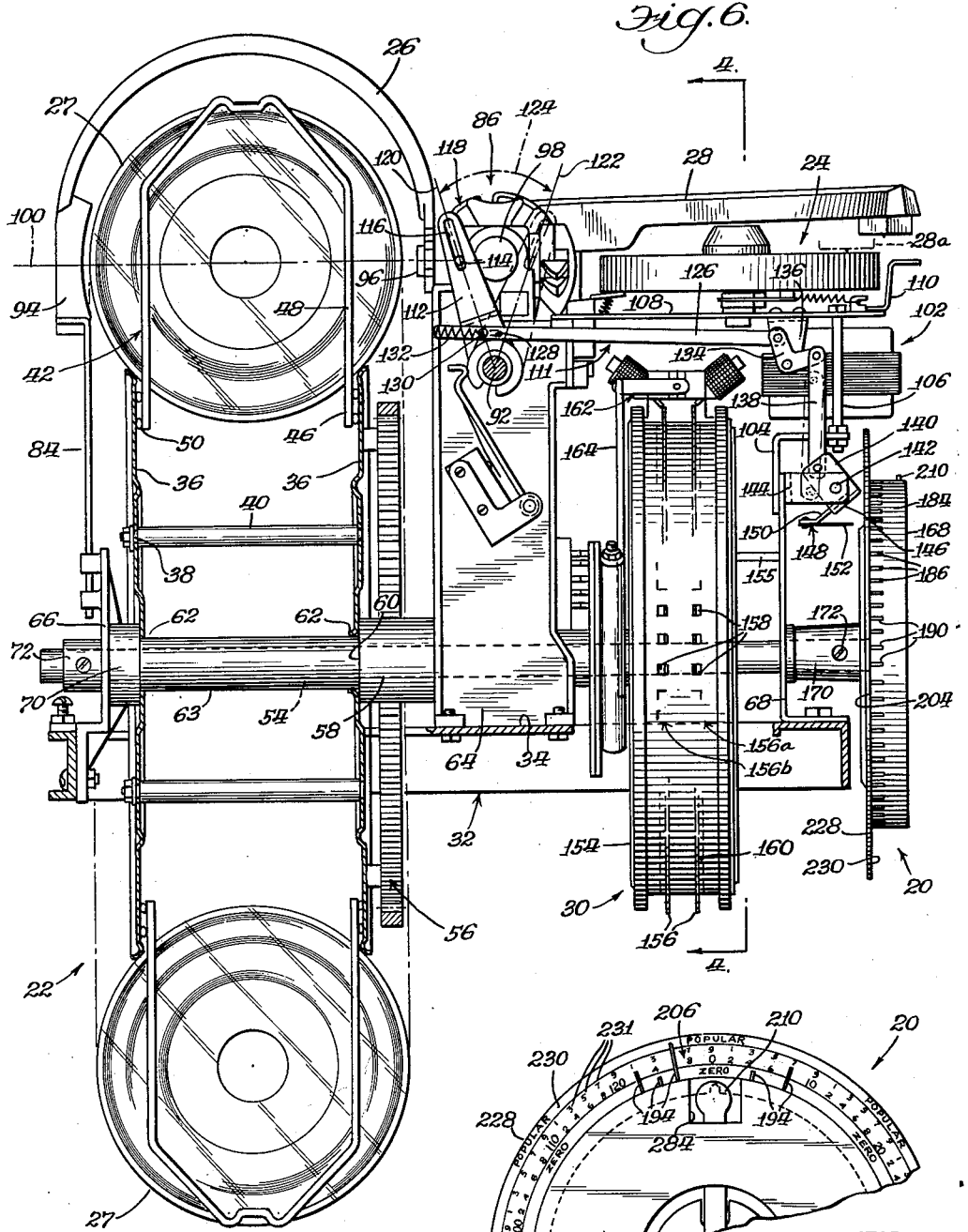
INVENTOR.
David C. Rockola
BY
Horton, Davis, Brewer & Brugman
Attys Jan. 22, 1963     D. C. ROCKOLA     3,074,725
AUTOMATIC PHONOGRAPH
Filed July 13, 1959     6 Sheets-Sheet 5
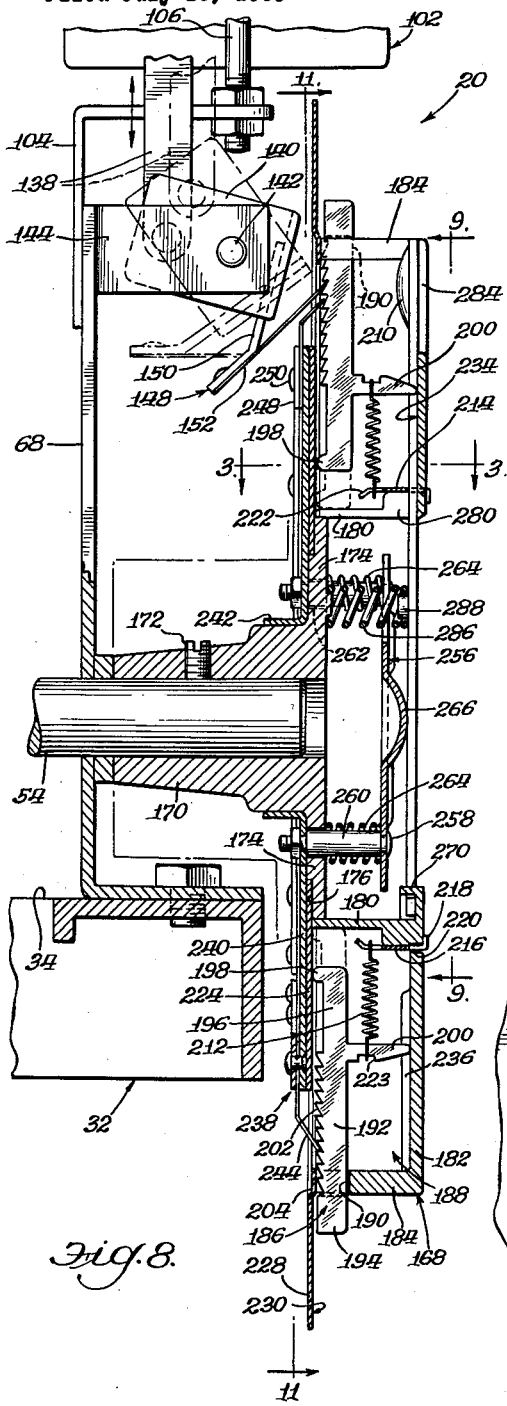
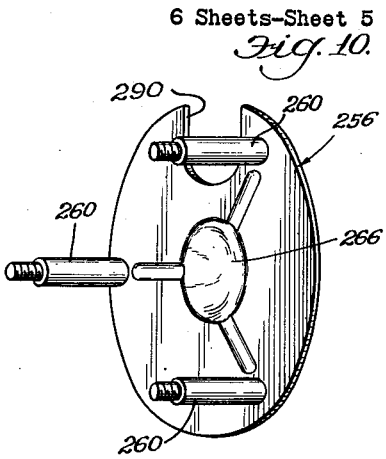
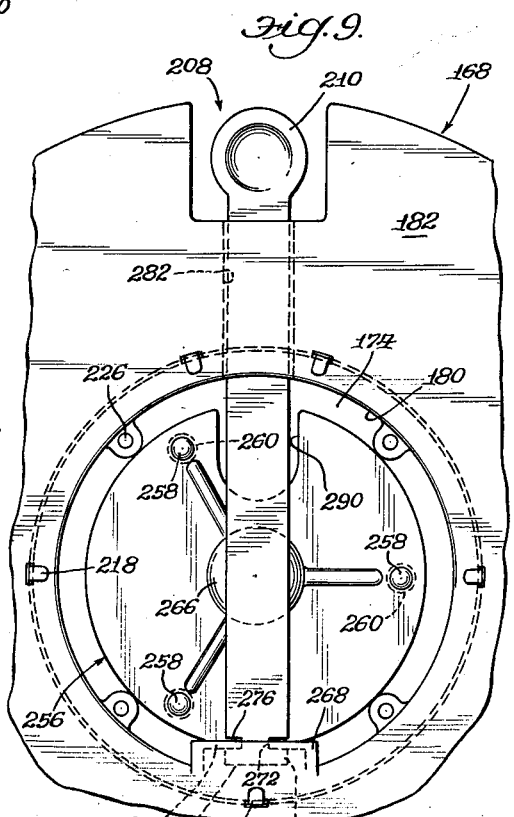
INVENTOR.
David C. Rockola
BY Horton, Davis, Brewer & Brugman
Attys

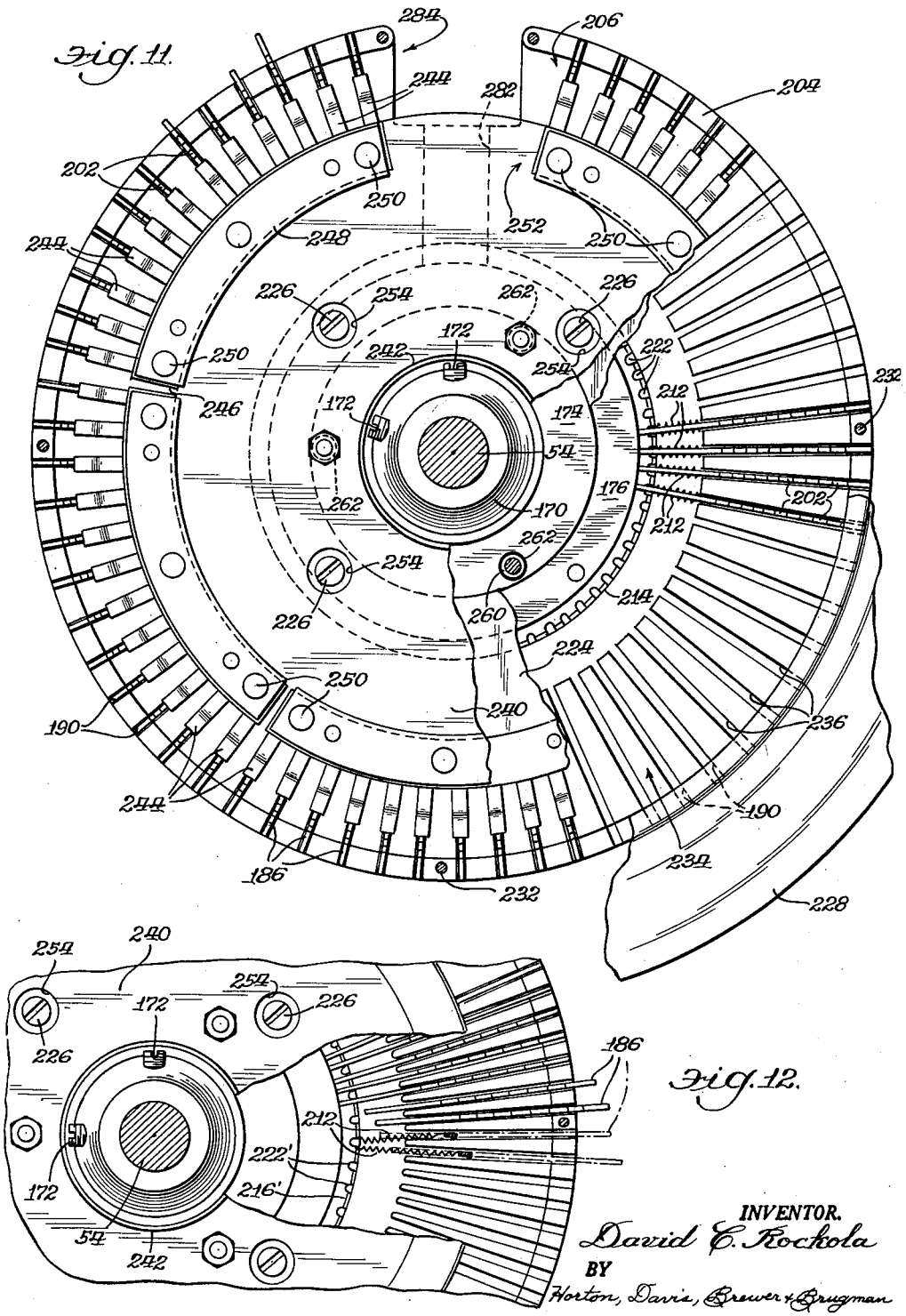

3,074,725
AUTOMATIC PHONOGRAPH
David C. Rockola, Chicago, Ill., assignor to Rock-Ola Manufacturing Corporation, Chicago, Ill., a corporation of Delaware
Filed July 13, 1959, Ser. No. 826,669
9 Claims. (Cl. 274—10)

The present invention relates to automatic phonographs, and more particularly to novel means for metering relative popularity of records as played in an automatic phonograph.

A broad object of the invention is to provide an automatic phonograph and novel means therein for metering the relative popularity of records as played therein, by utilizing a plurality of metering elements, similar in number to the records in the phonograph, positioned spatially proximate each other and, because of such proximity, made more conspicuous, visually, according to the frequency of play of the respective records.

Another object is to provide a novel popularity meter particularly adapted to automatic phonographs of the type having a rotary record magazine.

A further object is to provide a popularity meter of the foregoing general character that is extremely simple and economical to manufacture.

A still further object is to provide a popularity meter adapted for a phonograph having a cabinet enclosing substantially all of the operating parts, with a portion movable to an open position for exposing interior operating parts, wherein the popularity meter is entirely enclosed when the cabinet is closed, but in a position closely adjacent the exterior for easy access, as to a service man, when the cabinet is open.

Another object is to provide a popularity meter in an automatic phonograph having a rotatable record magazine with a portion disposed for easy access for replacing records therein, wherein the popularity meter is rotatable with the magazine and has a plurality of metering elements, one associated with each record in the magazine, the metering elements indicate the relative popularity of the records, and the respective metering elements associated with those records in the magazine which are in said easy-access portion of the magazine are themselves at that time in position for ready observation and are visually correlated, according to position, with the respective records in the magazine.

Another object is to provide, for an automatic phonograph, a popularity meter having as a permanent part thereof, a plurality of metering elements corresponding to respective ones of the records in the phonograph, movable to advanced positions according to the frequency of play of the records, and which indicate such frequency of play by relative degrees of exposure in advanced position, and the metering elements are movable to retracted position for successive metering functions, whereby expendable material for making a record of the frequency of plays is eliminated.

Other objects and advantages of the invention will appear from the following detailed description taken in conjunction with the accompanying drawings in which FIGURE 1 is a perspective view, principally in outline form, of an automatic phonograph embodying the features of the present invention;

FIGURE 3 is a sectional view taken on line 3—3 of FIGURE 8;

FIGURE 4 is a diagrammatic view, taken from the right of FIGURE 6, but with many of the elements omitted, showing particularly the correlation of the metering elements, selector levers and magazine pockets;

FIGURE 5 is a perspective view of the principal operating mechanism of the phonograph, removed from the casing;

FIGURE 6 is essentially a vertical view taken from the left of FIGURE 5, but with the record magazine in section, and certain other instrumentalities omitted;

FIGURE 7 is an elevational view of a portion of the popularity meter from the front, or that side presented to the observer in FIGURE 5, and with several of the metering elements in advanced positions;

FIGURE 8 is a sectional view of the popularity meter, on an enlarged scale, taken on line 8—8 of FIGURE 5;

FIGURE 9 is a view taken from the right of FIGURE 8, at line 9—9 thereon, and showing a central portion of the popularity meter;

FIGURE 10 is a perspective view of an actuating member in the popularity meter, utilized in releasing the metering elements therein from advanced positions;

FIGURE 11 is a view taken on line 11—11 of FIGURE 8 but with certain portions thereof deleted; and FIGURE 12 is a view oriented according to FIGURE 10 showing a fragment of a slightly modified form of popularity meter construction designed for accommodating a greater number of metering elements.

Figure 1:
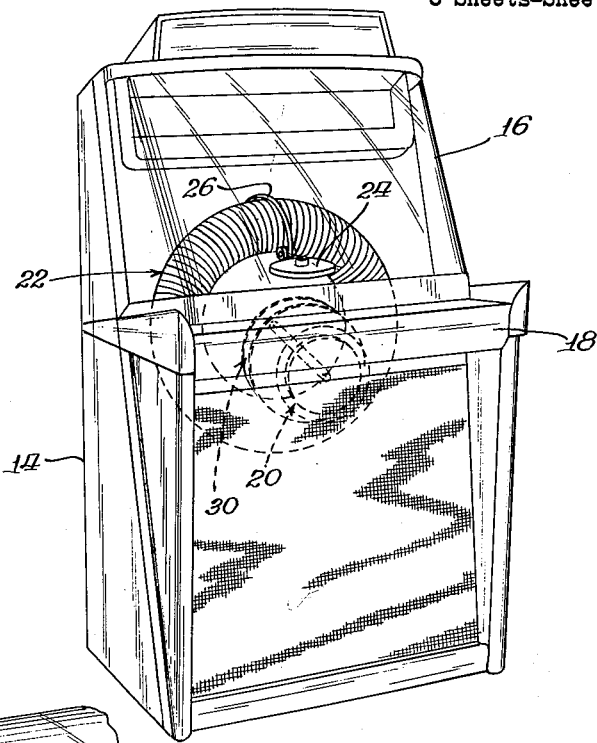
Figure 2:
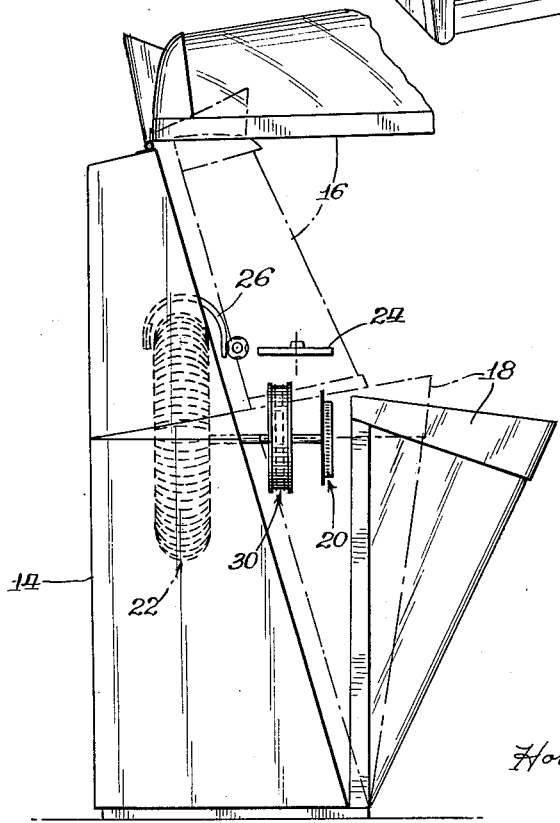
FIGURE 2 is a side view of the phonograph similar in character to FIGURE 1, indicating portions of the phonograph casing that may be opened, and the position of the popularity meter relative to the side of the casing that is open when those portions are in open position.

The phonograph selected for illustration of an embodiment of the present invention is shown in its entirety in FIGURES 1 and 2. The phonograph is of automatic character, and of the kind that in most instances is coin controlled. The popularity meter of the present invention operates to indicate relative popularity of plays of the records in the phonograph, such being more commonly desired in connection with a coin controlled automatic phonograph so as to facilitate provision by the service man thereof of most wanted records whereby in turn to derive maximum income from the phonograph.

The phonograph illustrated in its entirety in FIGURES 1 and 2 includes a casing 14, which, so far as the present invention is concerned, may be any of numerous kinds and designs, except that it is particularly adapted to location of the popularity meter in the phonograph for easy access thereto when the casing is opened. The popularity meter is so related to and associated with other portions of the operating mechanism that, in addition to being easily accessible by the service man when the casing is open, it is so related to the record magazine in the phonograph as to clearly and quickly indicate the relative popularity of the various records. The casing 14 includes two portions, 16 and 18, that may be opened, shown in full line position in which the casing is open and the operating mechanism is exposed for access by the service man. The popularity meter is indicated in its entirety at 20 and its position in FIGURES 1 and 2 shows its relation to the open side of the casing. The cabinet is closed in the dot-dash position of the parts.

The popularity meter is also shown in FIGURES 5 and 6 in relation to other principal parts of the operating mechanism of the phonograph. This operating mechanism is shown generally in its entirety in FIGURES 5 and 6, and includes the popularity meter 20, a rotary record magazine 22, a turntable 24, gripper arm 26 for transferring records 27 between the magazine and turntable, a tone arm 28, and a selector unit assembly 30. The different portions of this mechanism just referred to will be referred to again hereinbelow sufficient to disclose their relation to the popularity meter, but certain details of construction and operation thereof will be omitted in view of their disclosure in other patents and applications mentioned below, with a view to simplifying the present application.

The mechanism of FIGURES 5 and 6 includes a machine frame member 32 supported in place in the casing 14 in any suitable manner, and having a deck 34 on which various parts of the operating mechanism are mounted. The record magazine 22 includes front and rear hub plates 36 which may be formed as sheet metal stampings and are secured together in spaced relation, in rigid assembly by means of tie rods 38 on which are fitted spacer sleeves 40, in a known manner. Secured to the hub plates are a plurality of wires or bails 42 forming record pockets 44 between each two adjacent ones thereof. The wires or bails 42 are preferably generally U-shaped, having the free ends of the legs 48 thereof secured to the respective hub plates as by welding them thereto as indicated at 50. The wires or bails 42 are spaced apart around the hub plates in accordance with the number of pockets desired. The wires or bails are provided with projections 52 which are preferably of a light weight material such as a light weight plastic material. These projections are distributed linearly of each wire or bail for engagement with the respective records at generally uniformly distributed points. They are dimensioned so as to provide spaces between adjacent projections, considered circumferentially of the magazine, a distance slightly greater than the thickness of a record. These projections incidentally may be utilized for bearing numbers identifying the respective pockets.

The number of pockets 44 in the magazine may be as desired but in certain practical embodiments of the invention it has been found feasible to provide as many as 60 pockets or 100 pockets, alternatively, whereby to provide capacity for that many records, or 120 or 200 record sides, respectively, in the magazine at a given time.

The record magazine, in normal operation, has a home position shown in FIGURE 4, which is the position it assumes between cycles. It is desired that a certain latitude be provided in the movement of the magazine with respect to terminating one cycle and beginning the next, and in accordance therewith certain of the pockets thereof may be blanked, as shown at 44a in FIGURE 5, where a bar 54 may be secured to the adjacent wires or bails 42a forming those pockets, to prevent insertion of records therein. If desired, the projections 52 may be omitted from at least certain of the latter wires or bails. The number of pockets referred to above as being a desired number, such for example as 60 or 100, preferably is in addition to the blanked pockets 44a. The principles of the invention are applicable to a phonograph accommodating either 60 or 100 records, as well as any other number, but for the sake of simplifying description of a specific application of the invention, reference to this phase of the invention will be in relation to 60 records, or 120 sides, unless otherwise specified.

The record magazine thus described is mounted on a main shaft 54, and the popularity meter 20 is mounted on this same shaft for rotation therewith in a manner more fully explained hereinbelow. The record magazine proper is secured to the shaft for rotation therewith and is driven by a suitable motor 57 through conventional drive means which includes a driving gear 56. The gear 56 has a hub 58 secured to the shaft by suitable means such as a set screw, this hub forming a shoulder 60 against which the adjacent hub plate 36 is butted for securement of the record magazine in rigid position and against axial movement. The hub plates 36 have portions 62 directly engaging a sleeve 63 on the shaft which support the magazine on the shaft. The shaft 54 is supported on the deck 34 of the frame member 32 by suitable supports such as a main support bracket 64 substantially midway of the ends of the shaft, another bracket 66 on the opposite side of the magazine and adjacent the respective end of the shaft. A still further bracket 68 which may be in the form of a vertical transverse plate, is provided adjacent the opposite end of the shaft and adjacent the popularity meter 20. A collar 70 is positioned between the sleeve 63 and the bracket 66, and outwardly or rearwardly of the bracket 66 is a collar 72 secured to the shaft as by a set screw.

The pockets 44 of the magazine, as will be observed, are open at their radially outer extremities as is necessary for removal of the records from the magazine and insertion thereinto in accordance with the character of record transfer mechanism utilized in the illustrated phonograph. The records in the lower part of the magazine, where the radially outer ends of the pockets are lowermost, are retained in the pockets by a record retention means which includes an endless belt 74 (FIG. 5) trained over a plurality of pulleys which include an upper pair 76 and a lower pair 78. The upper pair of pulleys 76 are mounted in support brackets 80 the details of which need not be entered into, but these brackets possess a certain degree of resiliency for accommodating slight variations in tension in the belt. The lower pulleys 78 are mounted in brackets 82 which possess a considerable degree of resiliency, or spring mounting movement, to act as belt tighteners. These brackets 82 may be spring loaded for providing the desired tension in the belt necessary for retaining the records in the pockets against the action of gravity. The endless belt 74 is so mounted on the pulleys 76 and 78 as to provide an inner run 74a which directly engages the magazine and records therein, and an outer run 74b which is trained over the pulleys 78. The pulleys 78 are biased outwardly, away from each other, and act through the run 74b to hold the run 74a taut against the magazine and the records therein.

A support bracket 84 (FIG. 6) is mounted on the bracket 66 for receiving the free end of the gripper arm 26 and supporting it when the latter is resting in its position shown in FIGURE 6.

The gripper arm 26 is moved between its opposite positions by an actuating mechanism indicated in its entirety at 86 (FIG. 6). This actuating mechanism may be of the type disclosed in my prior Patent No. 2,804,307 issued August 27, 1957, although the particular type utilized does not enter into the essence of the present invention. The actuating mechanism 86 is operated by a gripper arm motor 88 (FIG. 5) through a gearing 90 and a shaft 92, the latter being shown in both FIGURES 5 and 6, and constituting a part of the actuating mechanism 86. The operation of the motor 88, actuating mechanism 86 and gripper arm 26 is such that a cycle of operation of moving a record from the magazine to the turntable and in return to the magazine is as follows: gripper elements 94 and 96 on the gripper arm 26 are moved toward each other into engagement with the record, and the gripper arm and certain associated elements are then swung about the axis of the shaft 98 (FIG. 6) in clockwise direction (FIG. 6) and during such movement and after the record has been withdrawn from the magazine, the gripper arm 26 is rotated 90° about an axis indicated by the line 100 to place one or the other side of the record uppermost, one or both movements being continued until the record rests on the turntable 24; thereafter the gripper elements 94 and 96 separate to release the record; after the record is thus placed on the turntable the tone arm 28 is moved over the record and lowered until the needle thereof engages the record as indicated at dotted-line position 28a; also after the record is placed on the turntable, the turntable is turned or rotated by the turntable motor 102 (FIGS. 5 and 6); after the record is played, the tone arm is lifted from the record and returned to an outer inactive position (FIG. 5); the gripper arm engages the record by movement of the gripper elements 94 and 96 toward each other; the gripper arm then reverses its movements to the position shown in FIGURES 5 and 6 to reinsert the record in the corresponding pocket of the magazine; the gripper elements 94 and 96 are then separated to release the record therefrom.

Various ones of the operating parts in the portion of the description just refrered to are mounted on the frame section 32 by means of support brackets 64 and 68. For example, transversely spaced sets of elements 104 and 106 are secured to and form extensions of the support bracket 68 and these elements together with the support bracket 64 support a horizontal plate 108 on which are mounted the turntable 24 and turntable motor 102. Also mounted on the plate 108 is a bracket 110 for supporting the free end of the gripper arm 26 when the gripper arm is in its position assumed just after placing the record on the turntable. The actuating mechanism, including the shaft 92, are suitably mounted on the support bracket 64.

The movement of the actuating mechanism 86 is utilized for providing the pulses for operating the popularity meter 20. The motion transmitting mechanism for producing this effect is indicated generally at 111, and includes a lever arm 112 mounted on the shaft 92 and arranged for rocking movement about the axis of that shaft by means of a pin 114 working in a slot 160 in the arm, the pin being mounted on an element of a Geneva movement 118 included in the actuating mechanism 86. The details of this Geneva movement and associated operating means for operating the gripper arm may be found in my above mentioned patent. This arm 112 oscillates between opposite positions, one of which is shown in full lines in FIGURE 6 and indicated by the longitudinal center line 120 and the other of which is indicated by a corresponding longitudinal center line 122 defining with the line 120 an included angle represented by arcuate line 124. The lever arm 112 assumes its full line position shown in FIGURE 6 when the gripper arm 26 is in its position shown in that figure, and moves to the opposite position represented by the center line 122 in response to movement of the gripper arm to its opposite position in which it places the record on the turntable. The movement of the gripper arm from the position shown in FIGURE 6 to the opposite position and in return to the position of FIGURE 6 represents a complete cycle of operation of playing a record; in this same cycle of operation the lever arm 112 completes a cycle of its movement, moving from its position shown in FIGURE 6 in advancing direction to the opposite position represented by the center line 122, and in retracting direction back to the position shown in FIGURE 6. This cycle of operation or movement of the lever arm 112 produces an operating step in connection with the popularity meter 20, i.e., it serves to advance a metering pin in the popularity meter, one step each time it completes a cycle, as explained fully hereinbelow.

The motion transmitting mechanism or linkage 111 further includes a horizontal rigid link 126 having adjacent one end thereof a slot 128 receiving a pin 130 mounted on the lever arm 112. This pin is spatially located relative to the axis of the lever arm for producing the desired degree of longitudinal movement of the link 126. A tension spring 132 is connected at one end to the pin 130 and its other end to the link in such direction and position that in response to rocking of the lever arm in the advancing portion of its cycle of movement (clockwise FIG. 6), corresponding linear or longitudinal movement is imparted to the link (to the right, FIG. 6). The link is yieldably moved in advancing direction, by virtue of the spring 132, the pin 130 having lost motion connection in the slot 128. In the retracting portion of the cycle of movement of the lever arm 112, the pin 130 engages the corresponding end edge of the slot and positively moves the link in retracting direction.

The opposite end of the link 126, or front end as viewed in FIGURES 5 and 6, is pivotally connected with one arm of a bell crank lever 134 which is pivotally mounted on a bracket 136 which in turn is supported by the horizontal plate 108. Pivotally connected with the other arm of the bell crank lever 134 is a rigid link 138, the opposite end of which is pivotally connected to a lever arm 140. The lever arm 140 is pivotally mounted on a pin 142 mounted in a bracket 144 which may be mounted on the support bracket 68. Preferably the bracket 144 and lever arm 140 are each one of a pair of corresponding or like elements (the other of which is not shown), spaced apart along the axis of the pin 142, for providing the desired mounting stability. The two lever arms 140 are provided with an interconnecting web element on which is mounted an actuating means 148 utilized for advancing the metering pins of the popularity meter 20. This actuating means 148 includes a strip 150 secured to the web element 146 and a leaf spring actuating finger 152 secured at one end to the strip 150 and having its opposite and free end positioned for engaging the metering pins of the popularity meter, in a manner disclosed in detail hereinbelow. However, it may be stated briefly at the present point that the leaf spring actuating finger 152, when in operation, moves between a normal inactive position which is that of FIGURE 6 to an opposite position shown in FIGURE 8 in which it is in position for moving the metering pin. Specifically this movement of the leaf spring finger 152 is produced as follows: Upon movement of the link 126 (FIG. 6) in advancing direction or to the right, the bell crank lever 134 rocks in clockwise direction and moves the link 138 downwardly, this downward movement then rocking the lever arm 140 in counterclockwise direction, resulting in the movement of the leaf spring actuating finger 152 from its inactive position in FIGURE 6 to its opposite position in FIGURE 8. Upon opposite or retracting movement of link 126, the various elements of course move in their respective opposite directions.

The selector unit assembly 30, referred to above, may be similar in construction and operation to the corresponding means of my prior patent mentioned above, and details thereof may be found in that patent. Operation of this selector unit assembly is related directly with the movement of the magazine and popularity meter. The selector unit assembly includes a drum 154 forming a housing for certain internal instrumentalities and is mounted stationarily on the frame 32, although the rotatable shaft extends therethrough. Convenient means, such as bolts 155, connected between the drum and the support bracket 68 may be utilized for restraining the drum against rotation. The drum includes a plurality of selector levers 156 arranged in two circular series or rows, 156a and 156b, disposed relatively front and rear and correlated respectively with odd and even sides of records in the magazine. These selector levers project through apertures 158 in the peripheral wall 160 of the drum and are arranged for swinging movement of their free, or radially outer, ends in axial directions in response to manual selection operations by means not disclosed herein. Cooperating with the selector levers 156 is a selector carriage 162 mounted on a radial arm 164 fixed to the shaft 54 for swinging movement in response to rotation of the shaft. In response to such swinging movement of the arm, the selector carriage 162 travels around the drum 154. The selector levers in each row, 156a and 156b are equal in number to the usable pockets 44 in the magazine and are aligned therewith in axial direction, there thus being two such selector levers aligned with each pocket, one of the 156a series and one of the 156b series. Upon manual selection of a desired recording on a record in the magazine according to its listing in a program holder in the phonograph, the selector lever 156, corresponding to the record bearing that recording, and more particularly the selector lever 156a or 156b corresponding to the side of that record bearing that recording, is moved in the appropriate direction to an active position for engagement by an element in the selector carriage 162. Upon making such selection, and completion of other necessary steps, such as depositing a coin, the magazine is rotated and the selector carriage, rotating with the carriage, engages the selector lever that was moved to its active position as described, and causes the magazine to stop with the record in question in an indexing position, which is that at the top in FIGURES 5 and 6, or in position to be gripped by the gripper arm 26; the playing operation described above then takes place. The particular selector lever 156a or 156b, which is actuated, together with the phase of the cycle of operation of the magazine, determines which side of the record in question is disposed upwardly on the turntable and played, as is brought out fully in the above-mentioned patent. As a practical manner of correlating the selector levers 156 with the pockets 44 of the magazine, there is a gap 166 (FIG. 4) between the ends of the circular series of the selector levers, which is disposed at the top of the stationary selector drum 154. When the magazine is in the home position which is that of FIGURE 5, the unused pockets 44a thereof are disposed at the top, and in this position, those unused pockets and the gap 166 are axially aligned. The selector carriage 162 is positioned in axial alignment with the unused pockets 44a, and therefore when the magazine is in its home position, the selector carriage is positioned in the gap 166, and out of position for contacting any of the selector levers 156. In such position of the magazine also, the selector levers 156 are aligned axially with the pockets 44 in the magazine, although the correlation for selection purposes does not correspond to this axial alignment, as brought out fully in my prior patent mentioned above.

The popularity meter 20 is mounted on the shaft 54 in certain relation with the record magazine, and thereby and incidentally with the drum 154; it is rotatable bodily with the shaft and hence with the magazine. The popularity meter includes a main body member 168 which preferably is in the form of a die casting and includes a hub element 170 fitted on the shaft 54 and fixedly secured thereto as by a screw 172. For the sake of convenience in description of the popularity meter and in making other reference thereto, it is regarded as having a front and a rear side, corresponding to similar orientation of the machine as a whole as regarded by a player, the front side being that presented to the observer in FIGURE 5 and to the right in FIGURES 6 and 8. The hub element 170 thus extends to the rear, and extending radially outwardly therefrom is a central wall element 174 having an annular countersunk portion 176. The wall element 174 merges into a forwardly extending inner flange, or axial wall element, 180 which in turn merges into an outer annular wall element 182 lying in a plane parallel with but forwardly of the plane of the first mentioned wall element 174. Finally the annular wall element 182 merges into an outer, rearwardly extending flange or peripheral wall element 184 defining the radially outer limit of the body member 168.

Mounted in the body member 168 are a plurality of metering pins 186 which provide the observable and movable elements palpably indicating relative popularity of plays of the records. These metering pins are mounted in radial arrangement in the annular space 188 defined by the inner and outer flanges 180 and 184 and wall element 182, and arranged for progressive and individual projection through apertures or slots 190 in the outer flange 184. These pins are all identical in construction and a description of one will suffice for all. Each pin includes a main longitudinal shank portion 192, an outer end portion 194, an inner end portion 196 with a rearwardly extending guiding projection 198 thereon, and a laterally and forwardly extending finger 200 intermediate the ends of the shank portion. Along the edge of the shank portion opposite that from which the finger 200 extends, or along the rear edge, is a series of ratchet teeth 202 for engagement by the leaf spring actuating finger 152 referred to above, in a manner to be fully described below.

The metering pins in retracted position abut and rest against the inner flange 180 and in this position have their outer end portions resting in the apertures or slots 190. The outer end edges of the pins, in this position of the pins, may be substantially flush with the outer surface of the outer flange 184, the pins thus being effectively within the confines of the body portion, but the thickness of that flange, or dimension in radial direction, is sufficient to form confining surfaces of substantial extent to restrain displacement of the pins in circumferential direction. The actual thickness of this flange may be as desired from the standpoint of strength of the body member. The apertures or slots 190 preferably open through the rear edge 204 of the flange 184 (see FIGS. 6, 8 and 11) for convenience in manufacture and assembly, and are of sufficient depth to accommodate the pins (FIG. 8), the pins being thus positioned with the rear edges thereof adjacent the plane of the rear edge of the flange 184.

The metering pins 186 are equal in number to the usable pockets 44 of the magazine and aligned axially respectively thereto. Accordingly, there is a space or gap 206 (FIGS. 5 and 7) between the ends of the series thereof, this gap therefore corresponding with the unused pockets 44a of the magazine. This gap is furthermore utilized for positioning a releasing means indicated in its entirety at 208 and including a manually actuated lever arm 210.

The means for biasing the metering pins 186 to retracted position include tension springs 212 connected between the pins and a split ring or collar 214. The ring 214 may be of suitable material, such as spring metal, and includes a linear strip or band portion 216 fitted flat to and substantially surrounding the inner flange 180, with tabs 218 extended through apertures 220 in the wall element 182 and clinched thereover for securing the ring in place. The linear strip 216 is provided with a plurality of rearwardly extending hooks 222 over each of which is hooked one end of a spring 212, the other end of which is hooked in a notch 223 in the finger portion 200 of a metering pin. In the present instance, there is preferably one such hook 222 for each metering pin, although an alternative arrangement may be availed of, as described below (FIG. 12).

Aiding in retaining the metering pins 186 in place in the space 188 is an annular plate 224 secured to the portion 176 of the rear or central wall element 174 by suitable means such as screws 226. The plate 224 extends over the space 188 for engagement by the projections 198 of the pins, and is of such dimension as to be engaged by those projections in any positions of the pins including their outermost or extreme radially outer advanced position. This plate however does not extend fully to the outer flange 184, whereby to leave space for entrance of the leaf spring actuating finger 152, referred to above for engagement with the ratchet teeth 202, as well as for entrance of other elements described below.

Also aiding in retaining the metering pins in place, and serving as an indicator gauge, is another annular plate 228 secured adjacent its inner marginal edge to the rear edge 204 of the outer flange 184 and extending radially outwardly therebeyond where, on its front surface 230, is imprinted indicia 231 for use in the popularity indicating function, and other markings not entering into the present invention. This annular plate may be secured in place by suitable means such as screws 232 and its inner marginal edge terminates inwardly at such location as to prevent displacement of the outer ends of the metering pins through the open ends of the apertures or slots 190. The metering pins therefore are retained in place through 3-point support, i.e. through the finger extension 200 against displacement forwardly, and through both end portions against displacement rearwardly, while being normally held radially inwardly by the springs 212.

The rear or inner surface 234 of the outer radial wall element 182 is provided with radial grooves 236 for receiving and guiding the fingers 200 of the metering pins, the grooves extending sufficient distance to accommodate the greatest movement of the pins in the popularity indicating movements in radial direction. The pins are held against turning or twisting movements about longitudinal axes by the grooves 236 and slots 190, and the inner ends of the pins are additionally held against objectional transverse or circumferential displacement by the springs 212.

Inwardly of the annular plate 224 is a means indicated generally at 238 for releasably retaining the metering pins in advanced or popularity indicating positions. This means includes a second annular plate 240 movable axially for the purpose stated. This plate has an inner flange element 242 slidingly and guidingly engaging the hub element 170, and its outer edge terminates at a convenient location such as adjacent the outer marginal edge of the first mentioned plate 224. Mounted on the outer marginal edge portion of the plate 240 are a plurality of radial leaf spring ratchet fingers 244 equal in number to the metering pins 186 and arranged in alignment with the respectively ones thereof.

These ratchet fingers for convenience in manufacture may be integral extensions of arcuate segments 246, and over these arcuate segments are similarly shaped strips 248 secured to the plate 240 by such means as rivets 250, tightly clamping the segments 246 between the strips and plate. A plurality of these segments 246 provide the necessary number of ratchet fingers 244 (FIG. 11); in the present instance five such arcuate segments and strips being provided, and they make up slightly less than a complete circle, leaving a gap 252 corresponding to and aligned with the gap 206 between the ends of the series of metering pins.

The ratchet fingers 244 are bent forwardly at their outer ends (FIG. 8) for engagement with the ratchet teeth 202 on the metering pins when the plate 240 is in active position, which is that in flat abutting engagement with the plate 224, as shown in FIGURE 8. For convenience the plate 240 is provided with apertures 254 for receiving the heads of the screws 226 which secure the plate 224 in place, for enabling the flat abutting engagement of the plates as mentioned. The ratchet fingers 244 are relatively flexible for enabling their flexing over the ratchet teeth 202 in response to movement of the metering pins 186 in radially outward direction.

The releasable retaining means 238 is arranged for releasing movement by manipulation of the manually actuated lever 210 (FIGS. 5 and 8), referred to above through the medium of a member or relatively small plate 256 (FIGS. 5, 8, 9 and 10). This member 256 is disposed in the cavity formed within the inner flange 180 and is connected with the plate 240 of the releasable retaining means for releasably moving the latter. This connecting means includes a plurality of, preferably three, bolts 258 and associated spacer sleeves 260. The sleeves on the bolts engage the corresponding members, namely plates 258 and 240 and space them apart a desired distance, the bolts having heads engaging one member and nuts threaded thereon engaging the other member for securing these two members in spaced rigid assembly, in the usual manner. The wall element 174 is provided with apertures 262 for receiving the bolt-spacer assemblies for free sliding movement therethrough, and compression springs 264 surround the bolt-spacer assemblies and are compressed between the wall element 174 and the member 256 for biasing the assembly in forward direction (to the right in FIG. 8) to the position in which the plate 240 flatly engages the plate 224 in the manner stated.

The member 256 is provided with a central forwardly convex button 266 engageable by the lever 210 and upon depression of the free end of the lever 210 (upper end FIG. 8) the lever is swung rearwardly which swings the assembly described rearwardly, i.e. the member 256 and plate 240, and this rearward movement of the plate 240 is sufficient to withdraw the ratchet fingers 244 from the ratchet teeth 202 and enable retraction of all of the metering pins 186 that had theretofore been moved to advanced or popularity metering positions, by the springs 212.

The three-point connection between the member 256 and plate 240 and the sliding engagement of the bolts connecting them in openings in the body member assure non-binding action of the assembly of those members in their rearward movement under the influence of the lever 210, aided by the central single-point engagement between the lever 210 and member 256 through the medium of the convex button 266.

For the purpose of pivotally mounting the manually actuated lever 210, the body member 168 of the popularity meter may be provided with an integral projection 268 (FIGS. 8 and 9), which has an inturned flange 270 with an opening 272 therein for receiving a notched portion 274 of the lever 210, the notches 276 of the latter receiving the marginal edges of the portions of the flange and the projection 278 of the lever below the notches engaging under those portions of the flange. This lever projects diametrically across the body member from its pivotal connection, through an opening 280 in the inner flange 180 (FIGS. 3 and 8), and normally lies against the inner surface 234 of the wall element 182, in its inactive position. This surface 234 at this location may be provided with a groove 282 (FIGS. 3 and 11) for receiving the lever. The outer swinging end of the lever then reposes in a cut-out portion 284 of the body member 168 for convenient engagement by the finger of the man attending the machine, such as a service man. This cut-out portion 284, as will be appreciated, is aligned with the gaps or spaces referred to above between the ends of the series of the metering pins and ratchet fingers 156.

A compression spring 286 is interposed between the wall element 174 and the lever 210, to bias the latter outwardly or forwardly to its inactive position, supplementing the force of the springs 264 in that action, the spring 286 being centered by suitable studs 288. The member 256 is provided with a notch 290 (see particularly FIGS. 9 and 10), for receiving the lever 210 when the latter is in inclined position due to its inward swinging movement.

In the foregoing construction including a 60-record, or 120-side arrangement, sixty metering pins 186 are provided, or one for each usable record pocket 44 in the magazine. This arrangement of pins is shown in FIGURE 11. As noted above, the present invention also finds practical embodiment in a 100-record, or 200-side, capacity phonograph. In the latter case the metering pins and the means for mounting them in place tend to become congested in view of the limitations on the overall size of the popularity meter which is limited to a certain maximum size because of other factors than those considered here. FIGURE 12 illustrates a portion of a popularity meter of the larger capacity mentioned, oriented similarly to FIGURE 11. The metering pins 186, as will be understood are more numerous per unit area, and hence closer together in circumferential direction. In order to minimize congestion, a ring or collar 216' is provided, having one-half as many hooks 222' thereon as there are metering pins, as contrasted with an equal number as in the FIGURE 11 embodiment, and two adjacent springs 212 are hooked onto a single hook 222'. A single hook 222' to which two springs are hooked, is so little removed from direct longitudinal alignment with either pin that each pin is retracted with practically the same efficiency as in the lesser-capacity embodiment.

Reference may be had to FIGURES 4 and 5, and particularly FIGURE 4, for the relation between the popularity meter and the record magazine from the standpoint of the correlation between the individual metering pins 186 and the respective record pockets 44 in the magazine to which they are related. The metering pins are axially aligned with those pockets, each pin being aligned with that particular pocket in the magazine the popuarity of the record in which it is to indicate. In the operation of the phonograph, the magazine is rotated to the position in which the record desired to be played is disposed in the indexing position, or at the top as viewed in FIGURE 5. The popularity meter rotates with the magazine, and when the desired record is in the indexing position, the corresponding metering pin is at the top, also as viewed in this figure.

In the subsequent steps of playing the record selected, the gripper arm 26 transfers the record to the turntable, and after the record is played, returns it to the magazine. In this complete cycle, the motion transmitting mechanism 111 which interconnects the gripper arm actuating mechanism and the actuating finger 152, passes through a complete cycle, as referred to above. The actuating finger 152 in passing through its cycle, moves from its lower retracted position of FIGURE 6 in counterclockwise direction up into engagement with the ratchet teeth 202 of that metering pin 186 that is then in alignment therewith, which is that corresponding with the record pocket of the magazine then in the indexing position, the actuating finger 152 working vertically so as to engage the desired indicating pin. The throw of the actuating finger is such as to move the metering pin upwardly (radially outwardly) a distance of one tooth 202, or slightly more, in which operation the corresponding ratchet finger 244 rides over a tooth and catches the next one, to retain the metering pin in its then advanced position. In the latter part of the cycle of movement of the actuating finger, it merely recedes or withdraws from engagement with the teeth 202.

The dimensions of the parts and the relation between them are such that the indicating finger 152 moves into actuating position above or radially outwardly of the ratchet finger 244, and into the space between the latter member and the outer plate 228. The finger 152 possesses substantial resilience to accommodate its movements just described.

In servicing the phonograph, the service man opens the cabinet, as indicated in FIGURE 2. The open cabinet presents the magazine to easy access by him, for facilitating changing records therein. The popularity meter is in full view of the service man when the casing is open, and moreover directly in line between the service man and magazine when he stands in front of the phonograph, as is customary in changing the records. In so changing the records he advances the magazine, or moves it in increments, and stops it after each such movement, or at least periodically to bring the records in the pockets thereof successively to the top or indexing position where it is easiest to remove and replace them. Due to the rotation of the popularity meter with the magazine, the metering pins follow the records in the pockets of the magazine, and when a particular pocket, with the record therein, is in the indexing position, the metering pin corresponding thereto is disposed at the top and in alignment therewith and in the direct line of sight of the service man.

It may occur that a group of adjacent records have all enjoyed such popularity that it is not necessary to replace any of those records. For example, suppose a group of records adjacent each other are all relatively popular, and the metering pins 186 corresponding to those records are all in projected position; it will not be necessary for the service man to stop the magazine for positioning each record at the indexing position in order to observe the condition of each pin, but in order to facilitate specific metering of the popularity of any one or several of those records of such group, the indicia 231, referred to above, is provided on the annular plate 182. These indicia include identification of the individual pockets of the magazine and thus directly tie in the relation between the metering pins and the records. In the present instance the indicia may include, for example, whole tens, e.g. 10, 20 etc., with single units indicated therebetween, e.g. 1, 2, 3 etc. The pockets of the magazine are customarily provided with identification numbers, not shown here but which may be provided on the projections 52, and with the indicia 231 thus correlated with such numbers, a quick indication of the popularity of any or all of a group of adjacent records is thus provided with guesswork eliminated.

The popularity meter is most effective as a meter of relative popularity. The metering pins 186 are close together, their outer ends, when the pins are retracted, being spaced apart a distance on the order of ¼"–⅜", in the application of the invention here described, and they project, when advanced, in the same direction from a deriving surface, namely, the surface of the outer flange 184. Whenever any one of the metering pins is advanced, its advanced position is readily obvious due to its close proximity to the adjacent pins and due to the same effective direction which all the pins advance relative to the same surface, namely the flange 184. The absolute number of times any record has been played is considered not to be of as great importance as relative popularity, and the popularity meter of the present invention provides a quick and palpable indication of relative popularity, without the necessity of the extra efforts of making comparisons of absolute numbers.

In view of the greater importance of relative popularity, indications of absolute numbers are omitted from the device constituting the present embodiment of the invention, although provision of such is contemplated within the scope of the invention, if such should be desired, and it is even not necessary to provide for unlimited range of advancement of the metering pins, since, given a certain degree of popularity, it is not necessary to know the extreme limits of popularity of a record therebeyond in order to properly determine whether it may well be left in the phonograph and not be replaced. In accordance therewith, therefore, the metering pins 186 may be provided with a limited number of ratchet teeth 202, such as for example ten in the present case, because if a given record is played at least ten times in the time period between successive servicings, its popularity is assured, sufficient to warrant leaving it in the phonograph.

The mounting of the popularity meter on the same means that mounts the magazine assures absolute and constant correlation between those two mechanisms, so that wherever the magazine stops after completion of a playing operation cycle, whether it always proceeds to the same home position or stops at random positions, the popularity meter remains in proper alignment therewith, avoiding the necessity for special means for returning the popularity meter to a home position. The common mounting of these two mechanisms is particularly effective and important in the case of a rotary magazine, as in the present instance, in that, in contrast to an arrangement wherein the meter is mounted for rectilinear movement, there is no need for reverse movement for returning the popularity meter to a home position. The bodily movement of the popularity meter with the magazine is an important feature in that extreme simplicity of construction and operation results.

The popularity meter of the present invention possesses the novel and important feature that it indicates relative popularity by means (metering pins) that become visibly more noticeable in proportion to the relative popularity indicated; this greater noticeability is partially due to the close proximity to each other, and partially due to increasingly relatively greater exposure, or more palpable condition. A further important feature is that these advantages are realized without utilizing expandable material.

It is thought that the invention and many of its attendant advantages will be understood from the foregoing description, and it will be apparent that various changes may be made in the form, construction and arrangement

I claim:

1. Metering means comprising a housing member having a radial body member, a central hub element for securement to a shaft, a surrounding axial flange with a peripheral series of apertures therein, a plurality of radially disposed pins mounted in the body member for radial sliding movement through said apertures between an inner position in which they are effectively contained within the housing member and outer positions in which they project beyond the peripheral flange, spring means biasing the pins inwardly, the pins each having teeth thereon for engagement by actuating means for moving them outwardly and also for engagement by retaining latch means, and a single manually releasable latch member biased toward the pins and having a circular series of elements one associated with each of said pins and positioned for engaging the teeth on the respective pin when the pin is moved to any of its outer positions and operative for releasably retaining the pin in any such outer position.

2. Metering means comprising a housing member having a radial body member, a central hub element for securement to a shaft, a surrounding axial flange with a peripheral series of apertures therein, a plurality of radially disposed pins mounted in the body member for radial sliding movement through said apertures between an inner position in which they are effectively contained within the housing member and outer positions in which they project beyond the peripheral flange, spring means biasing the pins inwardly, the pins each having teeth thereon for engagement by actuating means for moving them outwardly and also for engagement by retaining latch means, and means including a plate having a plurality of radial spring latch fingers associated with respective ones of the pins and engageable with the teeth thereon when the pins are moved to any of their outer positions, means biasing the plate toward the pins, and manually actuated means for engaging the plate at its central portion and moving it away from the pins for releasing the pins.

3. Metering means of the character disclosed comprising a body member having a fore-and-aft axis and a surrounding peripheral wall having a circumferential series of apertures therein, a plurality of radial pins in the body member mounted for radial sliding movement through said apertures, spring means biasing the pins radially inwardly, each pin having a series of ratchet teeth thereon exposed to the exterior for engagement by an actuating finger, a plate on said body member having a plurality of radial ratchet fingers engageable with said ratchet teeth for holding said pins in outwardly advanced positions, said plate being mounted for axial movement toward and from said pins, means maintaining said plate perpendicular to said axis in its movements therealong for simultaneous engagement of said ratchet fingers with said ratchet teeth, means biasing said plate toward said pins, and manually actuatable means for moving said plate away from said pins.

4. Metering means having a front and rear side and a fore-and-aft axis, a body member having an inner space bounded by a front wall and open to the rear and surrounded by a peripheral flange, said peripheral flange having a plurality of apertures therein opening through the rear edge surface thereof, a plurality of pins in said space disposed for radial movement through said apertures, an annular plate secured to the rear edge of said flange and retaining the outer ends of the pins against movement rearwardly out of the apertures and extending radially outwardly beyond the flange for providing a surface for imprinting indicia thereon related to said pins and their projection beyond the flange, an inner plate secured to the body member and overlying the inner ends of the pins and retaining them against rearward movement out of said space, the pins each having engagement at an intermediate point with said front wall, spring means biasing the pins radially inwardly, there being an annular space between said plates through which said pins are exposed to the rear, the pins having ratchet teeth on their rear edges for engagement by an actuating finger extending through said annular space, a third plate on the rear side of the body member having radial ratchet fingers individual to said pins and engageable with the ratchet teeth on the respective pins, said third plate being movable along said axis, means biasing said third plate forwardly to active position in which the ratchet fingers engage said teeth, and manually actuatable means for moving said third plate rearwardly for releasing the ratchet fingers from said teeth.

5. The combination set out in claim 4 in which said pins and apertures are non-circular in cross section whereby to restrain the pins against rotational displacement about axes longitudinally of the pins, and said front wall has radial grooves in its rear surface receiving said pins in sliding and guiding relation therein.

6. The combination set out in claim 4 in which a plate member is disposed on the front side of the body member, a plurality of bolts interconnect said third plate and plate member in rigid assembly and in guiding relation through openings in the body member whereby to maintain said third plate in position perpendicular to said axis in all positions of the plate along said axis, and a lever pivoted on the body member engageable with said plate member and operative on rearward swinging thereof for moving said assembly rearwardly and thereby said third plate rearwardly, said lever having at least a portion exposed to the front for engagement by the hand for rearward swinging movement thereby.

7. In an automatic phonograph, a rotary record magazine having a series of pockets, each adapted to removably receive and hold a record, said pockets being distributed around an axis of rotation and each having at least a large component of radial direction and opening at the periphery of the magazine, the magazine being mounted on a shaft for rotation for selectively positioning any of the pockets therein at an indexing position, a turntable, means for transferring a record between a pocket of said magazine when at said indexing position and said turntable, and means for metering placement of the records on the turntable including a body member mounted coaxially with the magazine for conjoint rotation therewith and a series of metering elements in the body member, one associated with and axially aligned with each of said magazine pockets, whereby upon rotation of the magazine and metering means the magazine pockets and metering elements maintain said axial alignment throughout the rotation thereof and in all positions of the magazine and metering means, each metering element being translatable between a regressed condition and a progressed condition, means biasing the metering element to regressed condition, and means responsive to movement of said record transferring means between alternate positions thereof operative for translating to progressed condition the respective one of said metering elements associated and aligned with the individual pocket disposed at said indexing position, adjacent ones of said metering elements being closely proximate each other, and the elements being exhibited more palpably in progressed condition than in regressed condition, whereby those of the elements which are near each other, due to their relative proximity and condition of regression and progression, visually indicate relative frequency of placement on the turntable records in the magazine pockets corresponding to the respective metering elements.

8. The invention set out in claim 7 in which the metering elements are pins physically moveable in their translation between regressed condition and progressed condition, and have greater portions bodily exposed to view in progressed condition than in regressed condition.

9. The invention set out in claim 8 in which the pins are arranged radially and thus extending at least in the general direction of the magazine pockets, and the pins in being moved between regressed condition and progressed condition are moved radially through apertures in the body member.

References Cited in the file of this patent
UNITED STATES PATENTS

| | | |
|---|---|---|
| 1,141,618 | Crosly et al. | June 1, 1915 |
| 1,202,967 | Chapman | Oct. 31, 1916 |
| 1,799,148 | Bryant | Apr. 7, 1931 |
| 2,631,856 | Osborne | Mar. 17, 1953 |
| 2,804,307 | Rockola | Aug. 27, 1957 |
| 2,906,538 | Rockola | Sept. 29, 1959 |
| 2,969,240 | Vanderzee et al. | Jan. 24, 1961 |